United States Patent [19]

Donovan

[11] 4,008,417
[45] Feb. 15, 1977

[54] PHASE LOSS DETECTOR

[75] Inventor: James P. Donovan, Louisville, Ky.

[73] Assignee: General Equipment and Manufacturing Company, Inc., Louisville, Ky.

[22] Filed: Sept. 26, 1975

[21] Appl. No.: 616,911

Related U.S. Application Data

[63] Continuation-in-part of Ser. No. 492,542, July 29, 1974, abandoned.

[52] U.S. Cl. .............................. 361/53; 307/235 T; 361/88
[51] Int. Cl.² ........................................ H02H 3/24
[58] Field of Search .............. 317/27 R, 31, 46, 47; 307/235 U, 235 T; 340/248 B, 253 H, 253 Y

[56] References Cited

UNITED STATES PATENTS

| 3,248,610 | 4/1966 | Faglie | 317/47 X |
| 3,513,353 | 5/1970 | Lansch | 317/31 |
| 3,636,541 | 1/1972 | Genuit et al. | 317/31 X |
| 3,749,944 | 7/1973 | Luebrecht | 307/235 T |
| 3,825,768 | 7/1974 | Grygera | 317/27 R X |

Primary Examiner—Harry Moose
Attorney, Agent, or Firm—Marshall & Yeasting

[57] ABSTRACT

An electronic monitoring circuit to detect unbalanced voltage conditions on a three phase alternating current line employs the charging current to a condenser connected across a full wave rectifier bridge to trigger a multivibrator circuit that controls an output relay in accordance with the multivibrator cycles per cycle of the power line voltage.

5 Claims, 3 Drawing Figures 4,008,417

PHASE LOSS DETECTOR

CROSS-REFERENCE TO RELATED APPLICATION

This application is a continuation-in-part of application Ser. No. 492,542, filed July 29, 1974, and now abandoned.

BACKGROUND OF THE INVENTION

Proper operation of multiphase electrical motors requires proper voltage or each phase and proper phase sequence. For example, if one phase lead to three phase induction motor is open the motor will not start or if running the motor continues to run but at a lower load carrying capacity. This may result in damage to the motor.

The opening of one phase lead, such as a broken wire, blown fuse, etc., may be detected by monitoring the current flow in each lead to the motor. This requires individual current detectors capable of carrying the maximum load current plus the monitoring equipment. Alternatively, the voltage of each phase may be monitored.

When the voltage is monitored the equipment must be stable and quite sensitive because the drop in voltage on a phase when a line is opened is limited by the generator action of any induction motors connected to the line and running.

BRIEF SUMMARY OF THE INVENTION

This invention provides a simple circuit that is responsive to the ripple voltage of a full-wave three-phase rectifier connected to the power line to be monitored. The circuit includes a monostable multivibrator arranged to energize a relay briefly once for each of the six ripple voltage peaks occurring in a normal three phase system. In the event one power lead is opened the resulting drop in voltage on two of the three line to line voltages eliminates four of the six ripple voltage peaks and thus reduces the net current flow to the relay so that it opens thus indicating a faulty condition.

The circuit according to the invention also includes means responsive to phase sequence or phase rotation to deenergize the relay in the event the phase sequence is reversed, which if it occurred would cause reversal of any motors operating on the line.

The improved circuit is "fail-safe" in that it requires normal operation of all components to produce a "normal" output signal condition.

SPECIFIC DESCRIPTION OF A PREFERRED EMBODIMENT

Figure 1:
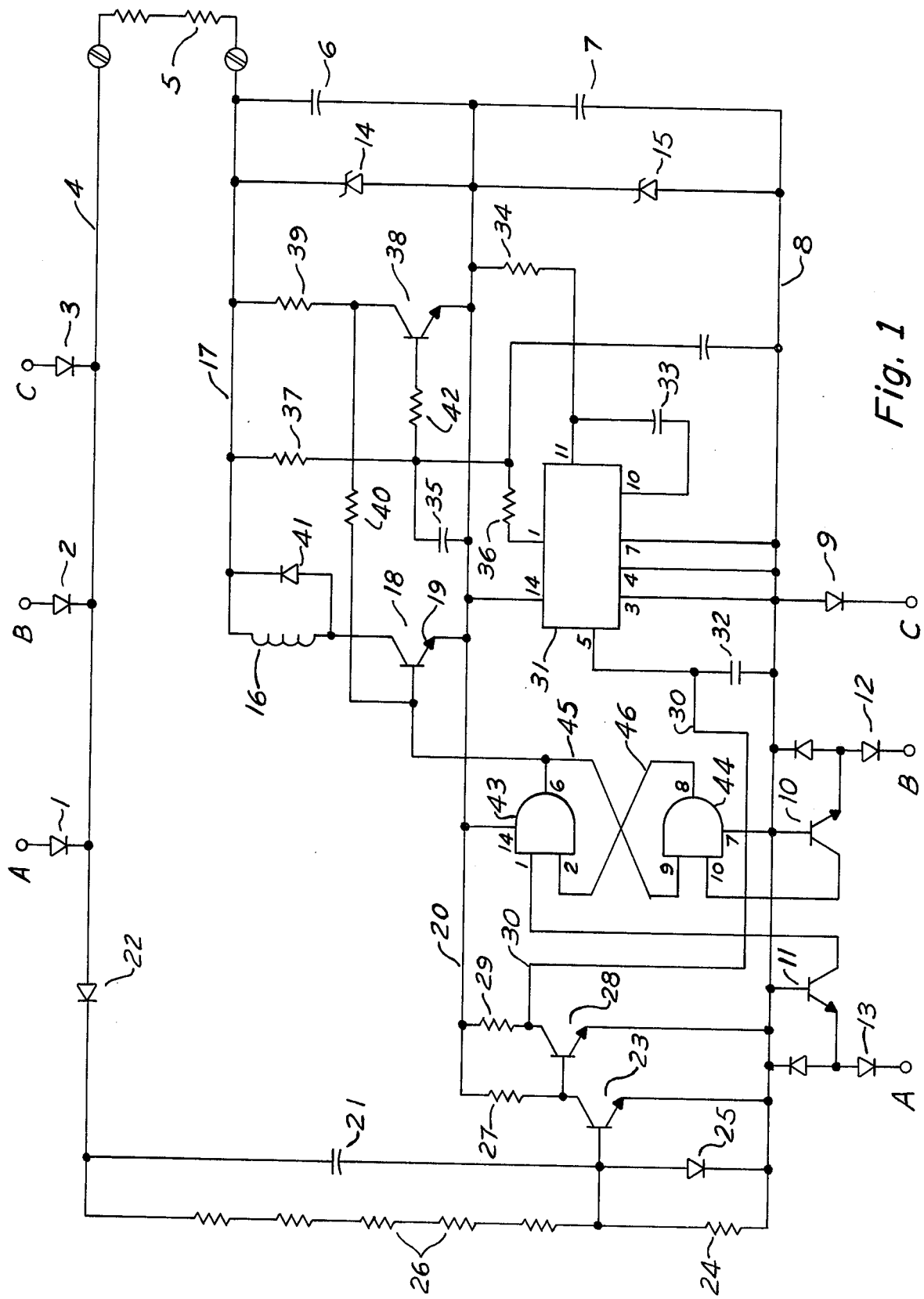
FIG. 1 is a schematic diagram of the improved phase loss detector circuit.

A first embodiment of the invention employs a circuit, as illustrated in FIG. 1, which comprises a full wave bridge rectifier to supply power to a detecting and relay driving circuit. As illustrated, a plurality of diodes 1, 2, 3, are arranged to conduct current from power lines A, B, C, which are to be monitored, to a positive power lead 4. The positive lead 4 is connected through voltage dropping resistors 5 to the positive end of series connected condensers 6 and 7. The negative end of the series connected condensers 6 and 7 is connected to a negative lead 8 which is connected through a diode 9 to power lead C, and through base-emitter paths of transistors 10 and 11 and diodes 12 and 13 to the power leads B and A respectively.

Zener diodes 14 and 15 limit the voltages on condensers 6 and 7 to approximately 120 volts and 5 volts respectively. Thus, the circuit through the condensers 6, in parallel with the zener diode 14, in effect constitutes a regulated power supply for a relay coil 16 connected between positive lead 17 and the collector of a transistor 18 the emitter 19 of which is connected to lead 20. The lead 20 is connected to the junction between the condensers 6 and 7 and is thus the negative side of the 120 volt supply. Likewise, the condenser 7 and zener diode 15 maintain a 5 volt difference in voltage between lead 20 and lead 8.

In a first form of the invention, in which the ripple voltage of the rectified voltage is sensed, a condenser 21 is connected through a diode 22 to the positive rectifier output lead 4, and its negative terminal is connected through the base-emitter path of a transistor 23 to the negative lead 8. A resistor 24 and diode 25 are connected in parallel with the transistor as protection from transients and as a control of sensitivity.

The principal control for sensitivity is a resistor 26 connected in parallel with the condenser 21. This resistor 26 drains part of the charge from the condenser 21 between peaks of the ripple voltage. If the line to line voltages on lines A, B, and C, are equal the ripple voltage shows six peaks per cycle of the power line voltage. If one line is open, two of the phase voltages are low so there are either two peaks per cycle (single phase operation) or two high peaks and four low peaks when there is three phase induction motor running single phase on the line. The time constant of the resistor 26 and condenser 21 is selected so that the voltage on the condenser 21 decreases somewhat less than the difference between the maximum voltage and the voltage on the lower voltage lines in a half cycle. Thus when the voltages are balanced the condenser is recharged six times per cycle, once for each peak voltage. If the line voltages are unbalanced, the condenser is recharged only by the higher voltage peaks.

A portion of the charging current flows through the base-emitter path of the transistor 23 thus drawing current from the line 20 through its collector resistor 27. The collector of transistor 23 is connected directly to the base of a second transistor 28. The collector of the second transistor 28 is connected to the line 20 through resistor 29. In the presence of charging current flowing through condenser 21, from the ripple voltage, transistor 23 is conducting with its collector near the potential of lead 8. This cuts off current flow through the second transistor 28 so that its collector goes positive. This positive going voltage is transmitted through lead 30 to trigger a monostable multivibrator 31. Preferably the multivibrator is an integrated circuit of the type designed as a 74121. The multivibrator 31, as illustrated, is constructed in a fourteen pin dual in-line package in which pin 14 is connected to a five volt power supply, pin 7 is the negative return lead, pins 3 and 4 are inputs for negative going input trigger voltage pulses, pin 5 is an input terminal for positive going trigger input voltage pulses, pins 10 and 11 are connections for an external timing capacitor, and pin 1 is the normally positive output terminal. As shown a transient suppressing condenser 32 is connected from lead 30 to lead 8. A timing condenser 33 is connected between multivibrator pins 10 and 11, and a timing resistor 34 is connected from pin 11 to line 20. The time constant of the timing resistor 34 and condenser 33 is such that the output terminal goes low (approximately 0.2 volt positive with respect to lead 8) for approximately 2 milliseconds in response to each charging interval for condenser 21. Since with a balanced line the charging pulses are 2.77 milliseconds apart, the output terminal is low about seventy percent of the time. When the line is unbalanced four out of six pulses are lost so the multivibrator output is low about 24 percent of the time.

When the output pin 1 of the multivibrator 31 is low it drains charge from a condenser 35 through a resistor 36. The condenser is supplied with current through a resistor 37. During balanced line conditions, sufficient current or charge is drained from the condenser to hold the base of a control transistor 38 below the conduction level so that no current flows in the collector-emitter path. During unbalanced line conditions the current drawn through the resistor 36 is less and the voltage applied to the base of transistor 38 rises above the conduction level. Transistor 38 then draws current through its collector load resistor 39 thus reducing the current flow through resistor 40 and the base-emitter path of transistor 18 to zero. This deenergizes the output relay 16 permitting it to open its contacts (not shown) to signal an unbalanced line condition.

A free wheeling diode 41 is connected across the coil of the relay 16 to limit the voltage at transistor 18 during turn off. Also, a resistor 42 inserted in the circuit to the base of control transistor 38 allows some variation in voltage on condenser 35 without cutting off the current through the transistors.

It is also desirable that the relay 16 to be energized by proper phase sequence and to be deenergized in the event the phase sequence is incorrect. In the illustrated circuit this is accomplished by a pair of gate circuits 43,44, connected as a bi-stable flip-flop. The gate circuits are preferably an integrated circuit of a type known as a 7420. The input of the first gate 43 is connected to the transistors 11 that is responsive to current flow to power lead A. The input to the second gate 44 is connected to transistor 10 that is responsive to current flow to power lead B. Thus when lead A goes negative with respect to leads B and C, the input to the first gate goes low and its output goes high. By cross coupling through leads 45,46 the input to gate 44 goes high and its output low. This condition holds until power line B goes negative with respect to lines A and C. Then the flip-flop reverses and the output of gate 43 goes low.

The output of gate 43 is connected to the base of relay control transistor 18 so that the transistor may energize the relay when the output of gate 43 is high and cut off the current when the gate is low. As shown, the correct phase sequence is A–C–B. Thus when line A goes negative the relay transistor 18 is turned on and remains on until line B goes negative two thirds of a power line cycle later. Then when A goes negative at the start of the next cycle the transistor is again turned on. Thus, relay current flows for two thirds of the time. If the phase sequence is reversed the relay current flows for one third of the time. The relay is adjusted to "pick up" on the two thirds energization and to fail to "pick up" on the one third energization. Since the base current for the relay transistor 18 is controlled by the unbalance detector including multivibrator 31 and by the gate circuit flip-flop, the relay 16 can be energized only if the voltages on the power lines are balanced and in proper sequence.

In the arrangement shown in FIG. 1 the sensing circuit responds to charging current flowing through the rectifier 22 and the base-emitter path of transistor 23. It is also possible to monitor the rectified voltage. In the circuit shown in FIG. 2 a condenser 50 has its positive terminal connected to the positive D.C. line 4. Its negative terminal is connected through diode 51 and resistor 52 to the base of input transistor 23 of the circuit shown in FIG. 1. The junction between diode 51 and resistor 52 is connected through resistor 53 to the lead 8 of the FIG. 1 circuit. Also a diode 54 and resistor 55 provide a discharge path for the condenser 50 when the D.C. voltage between leads 4 and 8 decreases.

In this circuit with balanced voltages on the power leads the ripple voltage peaks are nearly equal and there are six pulses of current per power line cycle. These pulses transmitted through the transistor 23 and the remainder of the sensing circuit shown in FIG. 1 maintain the relay energized. With unbalanced line voltages the condenser 50 is charged to a maximum voltage twice per cycle,. The voltage on the condenser during the remaining cycles of the ripple voltage is greater than the voltage between leads 4 and 8 so that there is no condenser recharge. Thus, as in the circuit shown in FIG. 1, the number of multivibrator cycles is two per power line cycle and the relay is released.

Figure 2:
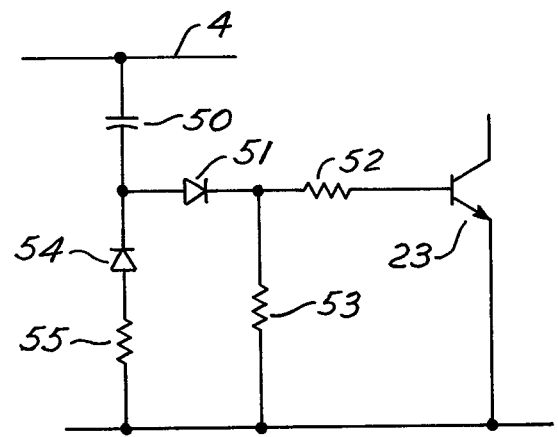
FIG. 2 is a schematic diagram of a circuit that may be substituted for a portion of the circuit shown in FIG. 1.
Figure 3:
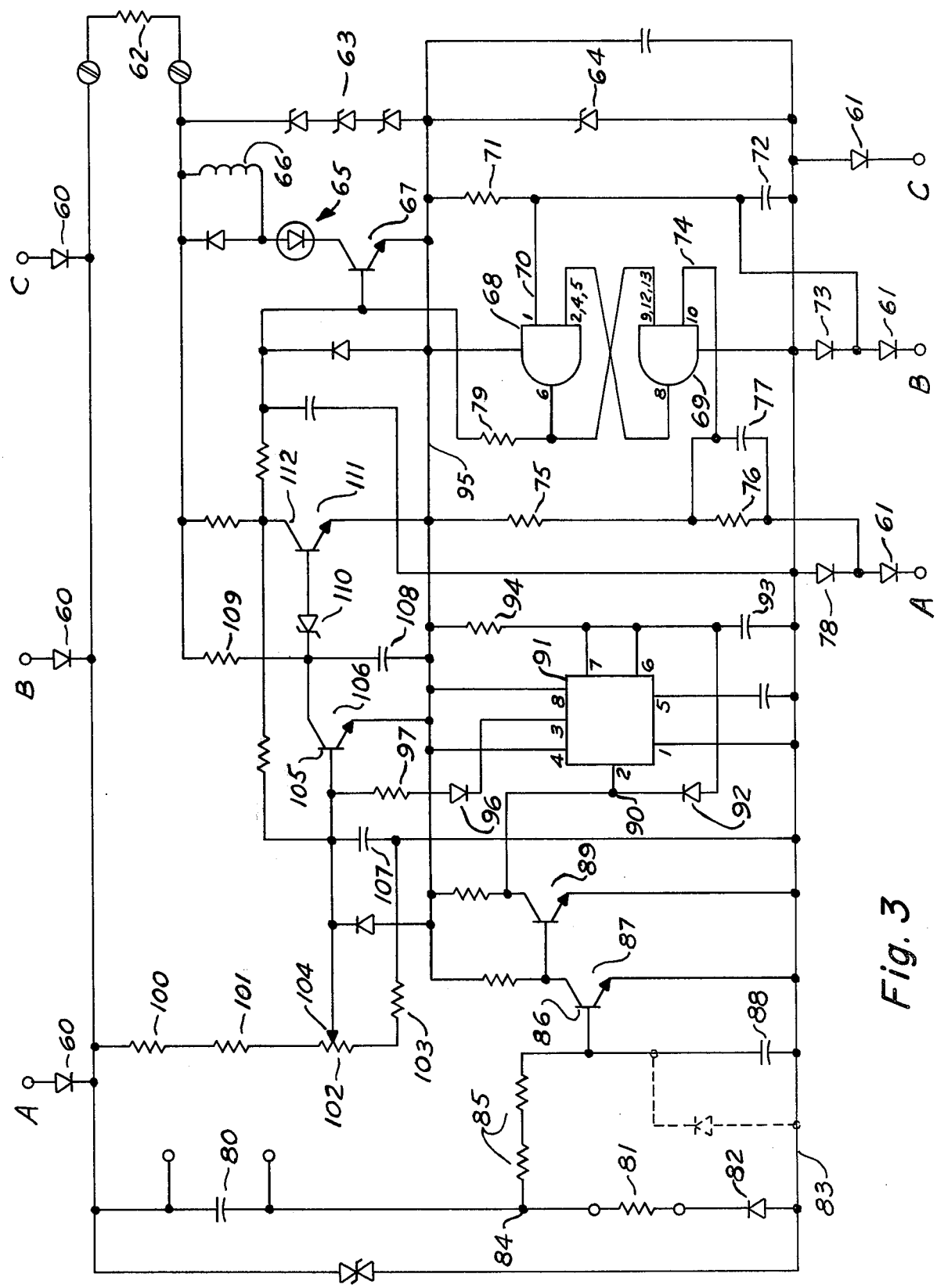
FIG. 3 is a schematic diagram of a modified circuit embodying the invention.

Referring now to FIG. 3, a phase loss circuit may be arranged to use the base-emitter junction of the transistor 23 of FIG. 2 in lieu of the diode 51. This modified circuit also shows a low voltage sensing circuit as well as improvements in the phase sequence detector circuit.

As shown in FIG. 3, the sensing circuits are connected to the output of a three phase bridge rectifier comprising three diodes 60 and three diodes 61 connected to a three phase power line to be monitored. The output of the bridge is connected through a voltage dropping resistor 62 to series of zener diodes 63 and 64. The zener diodes 63 provide a total voltage drop of about 100 volts to supply a relay circuit 65 while the zener diode 64 provides a 5 volt voltage to supply a timer circuit and sequence switch.

The relay circuit 65 comprises a relay coil 66 that is energized through a transistor 67 according to voltages for detecting circuits applied to the base of the transistor 67.

The sequence switch comprises a pair of gate circuits 68, 69, similar to the gate circuits 43, 44 of FIG. 1, arranged with the output of each connected to an input of the other. A second input 70 to the gate 68 is connected through a resistor 71 to the positive terminal of the 5 volt zener 64 and through a condenser 72 to the negative terminal of the 5 volt zener 64. The second input 70 is also connected to the cathode of a diode 73 connected in series with one of the diodes 61 of the three phase bridge. Thus the second input is low, i.e. active, while line current is flowing through the diode 73 and associated diode 61 and for a short time interval thereafter determined by the time constant of the resistor 71 and condenser 72.

A second input 74 of the gate 69 is connected to the positive five volt line, i.e. positive terminal of zener 64, through resistor 75 and through the parallel combination of resistor 76 and condenser 77 to the cathode of diode 78 connected in series with another of the bridge diodes 61. Thus the second input 74 is low for a brief interval following the start of current flow through the diode 78 and associated one of the bridge diodes 61.

In normal phase sequence the negative going impulse on input 74 occurs while input 70 is still held low by condenser 72 so that the flip-flop comprising the gates 68 and 69 remains in the condition with the output of gate 68 high. With the phase sequence reversed the impulse on input 74 occurs while input 70 is high so that the output of gate 68 goes low until input 70 again goes low. The output of gate 68 is connected to the base of transistor 67 through resistor 79 and serves to drive the base low and thus deenergize the relay during reversed phase operation.

As in the circuit shown in FIG. 1 the presence of unbalanced phase voltages is detected by changes in the ripple voltage of the full wave bridge rectifier caused by such unbalance. In the circuit of FIG. 3, a condenser 80 is connected to the positive output of the bridge rectifier. The negative terminal of the condenser 80 is connected through a selected resistor 81 and diode 82 to a lead 83 connected to the negative terminal of the 5 volt zener 64. A junction 84 between the resistor 81 and condenser 80 is connected through resistors 85 to a base 86 of transistor 87 the emitter of which is tied to the negative lead 83. The base-emitter path of the transistor thus serves as one of the diodes of the circuit shown in FIG. 2.

The base of transistor 87 is connected through a small capacitance condenser 88 to lead 83 to filter out sharp transient voltages.

The transistor 87 and a second transistor 89 form a two stage amplifier. The output of the second stage is connected to a trip input 90 (pin 2) of a timer circuit 91 and through a diode 92 to a timing condenser 93 of the timer circuit 91. The timer circuit is preferably an integrated circuit commonly identified by the number 555. A timing resistor 94 is connected between lead 95 connected to the positive side of the 5 volt zener 64 and the condensor 93 with the junction connected to the reset pins of the timer circuit 91.

The output of the timer is led through a diode 96 and resistor 97 to an amplifier which controls the relay drive transistor 67.

In this arrangement, in the preferred form, the resistor 81 is small or zero so that the condenser 80 is charged to a voltage approximately equal to the minimum instantaneous output voltage of the bridge rectifier. During most of the cycle time the condenser charges toward a higher voltage by current flow through the resistor 85 and transistor 87. This holds the output of transistor 89 high and the timer 91 in its timing condition. With balanced line voltages the condenser 80 is discharged to the minimum voltage six times per electrical cycle, each time cutting off current flow through the transistor 87. During these brief intervals the output voltage of transistor 89 goes low to discharge, and thus reset, the timing condenser 93. If the line voltages are not balanced, some of the negative going points of the ripple voltage do not reach the minimum output voltage so that current flow through the transistor 87 is not interrupted and the timer is not reset. In this event the timer times out and transmits a signal to the relay drive to indicate faulty line voltage.

The circuit of FIG. 3 also includes a low voltage sensing circuit consisting of resistors 100, 101, potentiometer 102 and resistor 103 connected across the output of the bridge rectifier. A slider 104 of the potentiometer along with the resistor 97 from the timer is connected to a base 105 of an input transistor 106 of an amplifier feeding signals to the relay drive transistor 67. The base 105 is also connected to the negative supply lead 83 through condenser 107 to average the output pulses from the timer 91. Thus whenever the line voltage drops below a selected value or is unbalanced, the base 105 goes low and current flow through the transistor 106 is cutoff. This allows condenser 108 to charge through resistor 109 until the breakdown voltage of zener diode 110 is reached so current may flow through the base-emitter path of transistor 111. This current flow drops the voltage at collector 112 of transistor 111 thus diverting current flow from the base of the relay drive transistor 67 to deenergize the relay coil 66.

The sensitivity of the circuit to voltage unbalance may be increased by increasing the resistance of the resistor 85 thus reducing the current flow through the condenser 80 and limiting the voltage on the condenser. The sensitivity may be further increased by shunting a large resistor around the condenser 80 to further reduce the current flow through the transistor 87.

The circuit as just described responds whenever the negative points of the ripple voltage of the rectifier appearing at the junction 84 fail to cutoff the current flow through transistor 87. The circuit may also be adjusted, by making the resistor 81 large with respect to the resistor 85 and substituting an inverting amplifier for the two stage non-inverting amplifier (transistor 87 and 89) to respond to the maximum voltage at the bridge output, i.e. to the positive crests of the ripple voltage appearing at the junction 84.

These circuits, according to the invention, provide means to monitor a power line for unbalance phase voltages resulting from loss of a connection to one power line or unbalanced loading of the several phases; or for low voltage on all power lines; or for improper phase sequence. The timing circuits allow quick response to improper phase sequence and delayed response to low or unbalanced voltages to provide protection without responding to short time transient conditions.

I claim:
1. In a circuit to detect improper voltages on a multiphase A.C. power line, in combination, a multiphase full wave diode bridge rectifier having its input arranged to be connected to the power lines to be monitored and having output terminals, a resistance load connected across the output terminals of the bridge rectifier whereby current flows continuously therethrough, a condenser and a first resistor connected in series across said output terminals, a discharge resistor connected across the condenser, a monostable multivibrator having a timing interval less than the time interval of one cycle of the ripple voltage of the bridge rectifier, means for triggering the multivibrator in response to current flow in said first resistor, a relay, and switching means connected to the multivibrator arranged to energize the relay according to the time the multivibrator is in its unbalanced state.

2. A circuit according to claim 1 in which the relay circuit and the multivibrator circuit are in series whereby the relay circuit current is used as power for the multivibrator circuit.

3. In a circuit to detect improper voltages on a multiphase A.C. power line, in combination, a plurality of rectifiers connected as a full wave bridge rectifier having a pair of output terminals; a resistance load connected to the output terminals whereby maximum ripple voltage appears at said terminals; a condenser, a first diode and a first resistor connected in series across said output terminals; a second diode and a second resistor connected in parallel with said first diode and resistor, and circuit means for detecting current flow in the second resistor as a measure of the ripple voltage.

4. In a circuit to detect improper voltages on a multiphase A.C. power line, in combination, a plurality of rectifiers connected as a full wave bridge rectifier having a pair of output terminals; a load connected to the output terminals such that the instantaneous output voltage corresponds successively to the respective phase voltages; a condenser, resistor, and base-emitter junction of a transistor connected in series across said output terminals; circuit means connected in parallel with said resistor and base-emitter junction for limiting reverse voltage across said resistor and base-emitter junction; and circuit means for detecting variations of current flow in said transistor as a measure of line voltage variations for indicating improper voltage on said multiphase power line.

5. A circuit according to claim 4 which includes a timer, means for resetting said timer in response to interruptions in current flow in the transistor, and means connected to and responsive to the timer for signaling a lack of said interruptions in current flow in response to improper voltages on said multiphase power line.

* * * * *